(12) United States Patent
Bohli et al.

(10) Patent No.: US 9,003,497 B2
(45) Date of Patent: Apr. 7, 2015

(54) METHOD AND SYSTEM FOR SECURE PAIRING OF WIRELESS DEVICES

(75) Inventors: Jens-Matthias Bohli, Mannheim (DE); Osman Ugus, Muhltal (DE)

(73) Assignee: NEC Europe Ltd., Heidelberg (DE)

( * ) Notice: Subject to any disclaimer, the term of this patent is extended or adjusted under 35 U.S.C. 154(b) by 107 days.

(21) Appl. No.: 13/824,768

(22) PCT Filed: Oct. 26, 2010

(86) PCT No.: PCT/EP2010/006529
§ 371 (c)(1),
(2), (4) Date: Apr. 10, 2013

(87) PCT Pub. No.: WO2012/055425
PCT Pub. Date: May 3, 2012

(65) Prior Publication Data
US 2013/0198816 A1    Aug. 1, 2013

(51) Int. Cl.
*H04L 29/06*    (2006.01)
*H04W 12/06*    (2009.01)

(52) U.S. Cl.
CPC ........... *H04W 12/06* (2013.01); *H04L 63/0853* (2013.01); *H04L 63/061* (2013.01); *H04L 63/18* (2013.01)

(58) Field of Classification Search
CPC ...................................................... H04W 12/06
USPC ............................................................ 726/4
See application file for complete search history.

(56) References Cited

U.S. PATENT DOCUMENTS

2007/0162741 A1    7/2007    Kasaura et al.

FOREIGN PATENT DOCUMENTS

| JP | 2003318875 A | 11/2003 |
|----|--------------|---------|
| JP | 2005228198 A | 8/2005 |
| JP | 2008028756 A | 2/2008 |
| JP | 2010063012 A | 3/2010 |
| JP | 2010224810 A | 10/2010 |
| JP | 2010226336 A | 10/2010 |
| JP | 2010226621 A | 10/2010 |

OTHER PUBLICATIONS

Burnside et al., "Proxy-Based Security Protocols in Networked Mobile Devices", ACM, 2002.*

(Continued)

*Primary Examiner* — Mohammad L Rahman
(74) *Attorney, Agent, or Firm* — Young & Thompson

(57) ABSTRACT

A method and system for securely pairing wireless devices, includes deploying a master device in a network environment, and a new device to be securely integrated into the network environment executes an unauthenticated key exchange with the master device. The master device has a security association with a camera system that monitors an operational area where the new device is placed, based on the exchanged key, the master device and the new device each compute a key confirmation code. The camera system learns the key confirmation code from the master device. The camera system watches for devices transmitting the key confirmation code and provides images of such identified devices to the master device, based on an analysis of an image of a device identified by the camera system, an authorization decision is made with respect to accepting the identified device as new device of the network environment.

20 Claims, 3 Drawing Sheets

(56) References Cited

OTHER PUBLICATIONS

Figure 1:
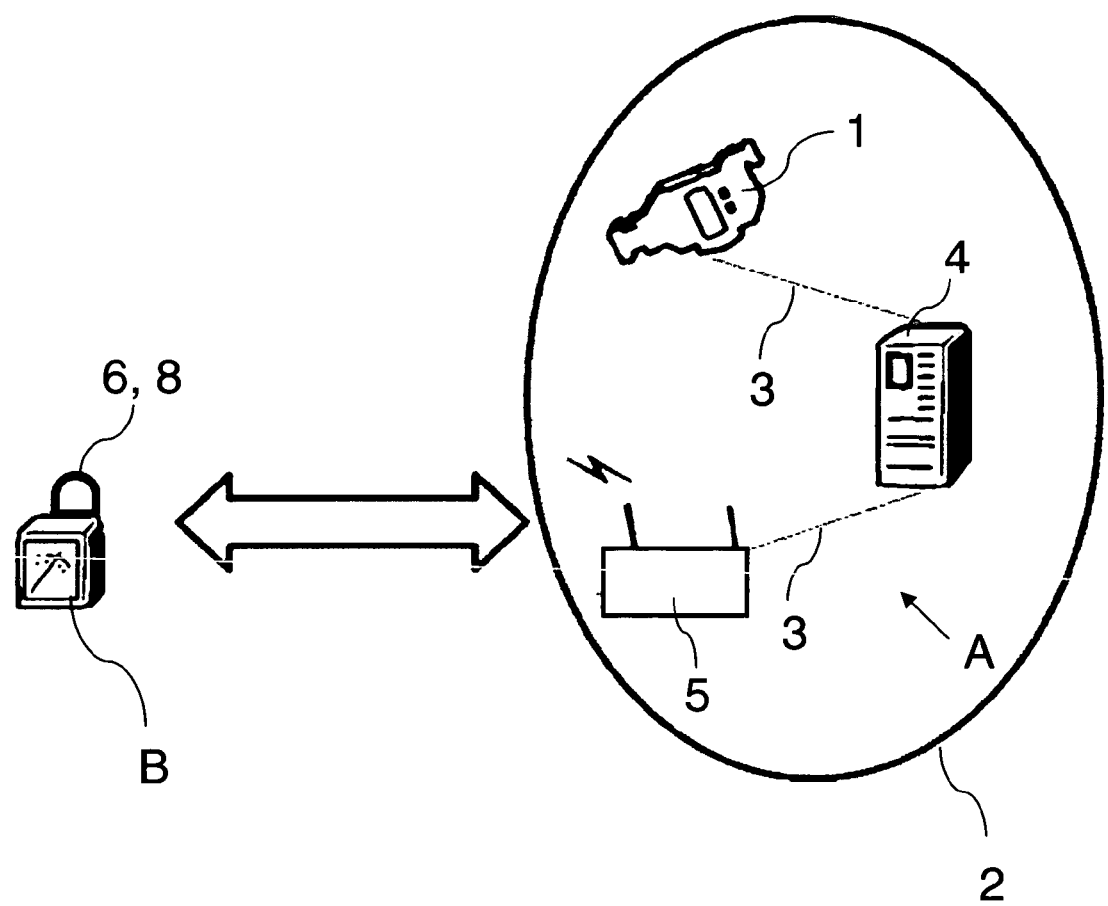

McCune et al., "Seeing-Is-Nelieving: Using Camera Phones for Human-Verifiable Authentication", IEEE, 2005.*
H. Imai, S. Shin and K. Kobara, "Authenticated Key Exchange for Wireless Security," IEEE Communications Society, pp. 1180-1186, 2005.*
U. Blumenthal, M. M. Buddhikot, J. A. Garay, S. C. Miller, S. Patel, L. Salgarelli and D. Stanley, "A Scheme for Authentication and Dynamic Key Exchange in Wireless Networks," Bell Labs Technical Journal, 2002.*
Nitesh Saxena: "Secure Device Pairing based on a Visual Channel", [Online] Jan. 1, 2006, pp. 117, XP007906602, Retrieved from the Internet: URL:http://eprint.iacr.org/2006/050.pdf> [retrieved on Dec. 10, 2008] * abstract p. 1, line 8-line 11 p. 2, line 1-line 45 p. 4, line 15-p. 5, line 9•, figure 2 p. 9, line 9-p. 10, line 3.
Eunah Kim et al.: "Providing secure mobile device pairing based on visual confirmation", May 25, 2009. Consumer Electronics, 2009. ISCE '09. IEEE 13th International Symposium on, IEEE, Piscataway, NJ, USA, pp. 676-680, XP031484603, ISBN: 978-1-4244-2975-2 abstract p. 677, right-hand column, paragraph 3-p. 679, right-hand column, paragraph 5.
International Search Report, dated Mar. 17, 2011, from corresponding PCT application.

\* cited by examiner

METHOD AND SYSTEM FOR SECURE PAIRING OF WIRELESS DEVICES The present invention relates to a method for secure pairing of wireless devices, wherein a master device is deployed in a network environment, and wherein a new device to be securely integrated into said network environment executes an unauthenticated key exchange with said master device.

Furthermore, the present invention relates to a system for secure pairing of wireless devices, said system including a master device that is deployed in a network environment, wherein a new device to be securely integrated into said network environment is configured to execute an unauthenticated key exchange with said master device.

The number of devices that have wireless communication capabilities is steadily increasing. For instance, sensors for measuring different kinds of variables that transmit measurement results to a central control entity in a wireless fashion are deployed more and more often, in particular in plants for controlling industrial production processes, or in office and home environment, where wireless sensors collect information such as temperature, light, and state of home appliances. A related kind of devices equipped with wireless communication technology are M2M (Machine-to-Machine) devices. M2M devices can appear in a variety of different forms, e.g. as machines, robots, vehicles, containers, and typically they are configured to automatically exchange information among each other and/or with a central control station.

To make such wireless applications secure, communication between the devices involved needs to be secured in order to protect confidentiality, integrity and authenticity of information and commands. This means that new devices should be able to securely communicate with already deployed devices and the infrastructure in place. In particular, it has to be avoided that an unauthorized device can connect to already deployed devices or the corresponding network and is able to read confidential information or write unauthorized data or commands. Therefore, a secure communication channel from new devices to an already deployed master (or host) device or network needs to be established. To bootstrap secure communication to a new device, a secret key, either a symmetric one or an asymmetric one, has to be established between the master device and the new device. However, as no prior security context with the new device is available, a pairing over the wireless channel brings the risk of attacks, e.g. man-in-the-middle attacks.

Solutions to this problem are secure pairing protocols. Secure pairing protocols use an out-of-band (OOB) channel, which usually has a low data rate, to transmit additional information to authenticate the key established on the wireless channel. A recent overview of prior art of secure pairing protocols is given in Alfred Kobsa, Rahim Sonawalla, Gene Tsudik, Ersin Uzun, Yang Wang, "Serial hook-ups: a comparative usability study of secure device pairing methods", Proceedings of the 5th Symposium on Usable Privacy and Security, 2009. In this document existing pairing schemes are analysed according to the following criteria:

1. Device requirements of the sending and receiving device in the OOB (or requirements of both devices if the OOB channel is used bidirectional).
2. User actions necessary during the protocol. The user actions are analyzed for the following three phases of a pairing protocol:
Setup (Phase I): user actions to bootstrap the method and to establish the OOB channel.
Exchange (Phase II): user actions as part of the protocol.
Outcome (Phase III): user actions finalizing the method.

The type of OOB channel used in prior art varies: In some cases the OOB channel is established between the devices and the user, such as the user giving inputs (any means of user input, e.g., pressing a button) or the user comparing outputs (usually visible output, e.g. output on a display, but also audible sequences are possible). In other cases it is an OOB channel between the devices to be paired which is specifically set up by the user.

Regardless of the specific kind of OOB channel actually employed, the methods from prior art have in common that the additional OOB channel is set up specifically between the devices to be paired so that no man-in-the-middle can be present. Consequently, the devices are arranged to each other so that no third party can be within the OOB channel and that the user handling the devices is involved in controlling the channel, e.g. by connecting a cable, by adjusting camera and display of devices, etc. This clearly limits usability, since arranging the devices in a way required for a state of the art pairing can be cumbersome. For instance, the normal workflow in an industrial plant is interrupted when a worker who brings a new wireless device has to register it at a control point. As already mentioned above, the device to be installed or integrated into the process could be a common thing such as any container with raw material or any smart tool that the worker carries). Apparently, large objects such as containers are particularly difficult to arrange in a specific way. In a home environment persons, who are inexperienced in technology and information security, will be bringing smart objects home. An active pairing procedure would often be too complicated for these persons to execute. Moreover, remote management of a home network is difficult with state of the art solutions. Therefore, state of the art pairing solutions are not ideal in terms of usability.

It is therefore an object of the present invention to improve and further develop a method and a system for secure pairing of wireless devices of the initially described type in such a way that, by employing means that are readily to implement, the required handling of devices is reduced and usability is improved.

In accordance with the invention, the aforementioned object is accomplished by a method comprising the features of claim 1. According to this claim, such a method is characterized in that
said master device has a security association with a camera system that monitors an operational area where said new wireless device is placed,
based on the exchanged key, said master device and said new device each compute a key confirmation code, wherein said camera system learns said key confirmation code from said master device,
said camera system watches for devices transmitting said key confirmation code via a visual out-of-band channel and provides images of such identified devices to said master device,
based on an analysis of an image of a device identified by said camera system, an authorization decision is made with respect to accepting said identified device as new device of said network environment.

Furthermore, the aforementioned object is accomplished by a system comprising the features of claim 12. According to this claim, such a system is characterized in that the system further includes
a camera system having a security association with said master device, which monitors an operational area where new wireless devices are placed, and which learns a key confirmation code computed by said master device and said new device based on the exchanged key, a visual out-of-band channel employed by said new device to transmit said key confirmation code, wherein said camera system is configured to watch for devices transmitting said key confirmation code and to provide images of such identified devices to said master device, evaluation means for analyzing an image of a device identified by said camera system, and decision means for making an authorization decision with respect to accepting said identified device as new device (B) of said network environment.

According to the invention it has been recognized that a higher usability in a secure pairing process can be provided by combining the employment of a visual OOB and camera monitoring in a specific way. The present invention assumes that a camera system is present with an already deployed device or network that is monitoring the area where the new device is placed, e.g. in a plant, office or home environment. The already deployed device has already a security association with the camera system. A wireless key establishment protocol between the already deployed device (A) and the new device (B) is executed. The new device will use a visual out of band signal detected by the camera system to transmit a key confirmation code to the camera system. The already deployed device can, with help of the camera, identify the device that was the partner in the pairing operation (i.e. device B or a man-in-the-middle). To detect a possible attack, the image of the identified device, i.e. the picture taken by the camera system, is used to make an authorization decision.

According to the present invention the camera system uses image recognition to identify an object transmitting the key confirmation code. This step is entirely different compared to prior art, as in prior art the OOB channel is specifically arranged to receive a (potentially wrong) signal from the new device. In contrast, according to the present invention a (potentially wrong) object is identified that transmits the expected signal. In other words, the present invention looks for the device that was partner in the wireless pairing with the master device using a camera and image processing and then verifies that this is the intended device. Prior art solutions first set up an OOB channel between the new device and the host device only and then verify that those devices were partner in the wireless pairing.

The method and the system according to the present invention come along with various advantages. For instance, the user does not need to be involved in the Setup and Exchange phase of the out-of-band-channel use. Only a yes/no decision of the user is needed in the Outcome phase, if the user needs to be involved at all. As a consequence, the present invention provides highest usability of existing pairing mechanisms, suitable for fully automatic pairing for, e.g., M2M applications. The only prerequisites that have to be in place for the present invention to work is that the area where new devices are installed or used need to be camera monitored (which is already the case in many industrial production sites) or master device A needs to have a camera. Furthermore, new devices need to be able to send on a visual channel, e.g. by employing a light source or by displaying a code. The light source or the display needs to be placed on the device in a way that is in normal use visible to the installed camera system.

According to a preferred embodiment the operational area monitored by the camera system is a plant, an office or a home environment. In particular, plants and company premises are already frequently camera monitored, so that in such cases the prerequisites are already given. But also in home automation scenarios with remote management of wireless devices including sensors and actuators an installed camera system may be present to monitor the home environment in order to detect user and device activities.

Depending on the specific characteristics of the operational area where new wireless devices will be placed the camera system may include one or more fixedly arranged cameras. Alternatively or additionally, the camera system may include one or more mobile cameras, for instance robots that are equipped with a mounted camera and that can move freely within the operational area.

With respect to an effective exchange phase of the pairing process it may be provided that the unauthenticated key exchange between a new device and the already deployed master device is performed according to Diffie-Hellmann or other key exchange protocols known from prior art, which are easily to execute even for less powerful devices and which work reliably to bootstrap communication to a new device. In case of the deployment of asymmetric keys, a simple transmission of the key may be used for performing the unauthenticated key exchange.

With respect to an efficient calculation of a key confirmation code it may be provided that the key confirmation code is computed by calculating a hash value of the exchanged key. Master device and new devices may agree upon other key confirmation codes, however, in any case, it should be guaranteed that the calculation is hardly invertible, i.e. that it is almost impossible to calculate back the exchanged key from the key confirmation code.

After the master device having computed the key confirmation code, it transmits the code to the connected camera system. This may be done by using the existing security association.

In a preferred embodiment, after the camera system having learnt the key confirmation code from the master device, the camera system may use pattern recognition for identifying a device that transmits the key confirmation code learnt from the master device via the out of band channel.

The out of band channel, in the following briefly denoted OOB channel, may be established in different ways. According to a preferred embodiment the new devices are equipped with a light source, in particular an LED, so that the key confirmation code can be visually transmitted by appropriate blinking of the LED. The LED should be mounted on the devices at a position that is visible by the camera system when the device is carried or operated as intended. The LED's may operate in the visible or in the infrared frequency range, wherein the reception characteristics of the cameras of the camera system must be adopted to the transmission range of the LEDs.

According to another preferred embodiment the visual OOB channel may be established by new devices being equipped with displays that are configured to display one- or two-dimensional barcodes. The barcodes representing the respective key confirmation code can then be detected and read by the cameras of the camera system.

With respect to enhanced security, it may be provided that the pairing process is aborted in case the camera system does not identify a new device transmitting the key confirmation code. In this regard a timeout mechanism with an admissible time window of configurable length may be implemented that starts running at the point in time when the camera system learns the key confirmation code from the master device.

After having identified a device that transmits the key confirmation code within the admissible time window the camera system takes a picture of the identified device. In this context it is beneficial that the picture not only includes the device itself but also the surroundings of the device. This additional information may be useful for an operator and may further assist him by taking a decision regarding an authorization of the device. For instance, the device shown in the picture may look correct, but the device may appear in an unexpected surrounding, which may trigger an operator to further investigate the case and to perform additional checks regarding the trustworthiness of that device.

It is important to note that no storage of the camera recordings is required, since the camera system is only used to identify (and possibly localize) a device sending a certain key confirmation code. Once the camera system has taken the image of the identified object (possibly with its surroundings) it sends the image to the master device. The master device may be configured to display the image of the identified device on a connected display. In this case an operator on the display is enabled to analyze the picture and to make the authorization decision with respect to accepting the identified device as new device of the network environment. In other words, the operator uses the picture taken by the camera system to verify that the identified device that is shown on the picture is the intended device that shall be integrated into the network environment. The authorization can be given in a very useable way: by displaying the taken picture to a person responsible for the monitored operational area and by requesting approval by displaying respective buttons for the possible decision (i.e. by providing buttons for a yes/no decision that have to be pressed by the person in charge). The decision can be made from a remote location.

Further to an operator involved solution, it is possible to fully automate the pairing by using image recognition that authorizes new devices. In such case machine usable knowledge regarding the recognition of eligible devices (i.e. ones that should be granted access) is required.

New devices that can be integrated into the network environment can appear in very different forms. In particular the new devices may include wireless sensors and/or actuators as they are employed e.g. in industrial production sites. Moreover, new devices can be any common things such as containers, e.g. with raw material, or any smart tools that are carried, e.g. by workers in a plant.

The master device may be any device that is already deployed and integrated into the network environment and that has already established a security association with the camera system. According to a preferred embodiment the master device is a server that is in charge of managing the network environment. In particular, the master device may be part of a remote control center, e.g. in an industrial production site. However, in particular in connection with applications in home environments, the master device may be a portable communication device that is equipped with a camera.

Figure 2:
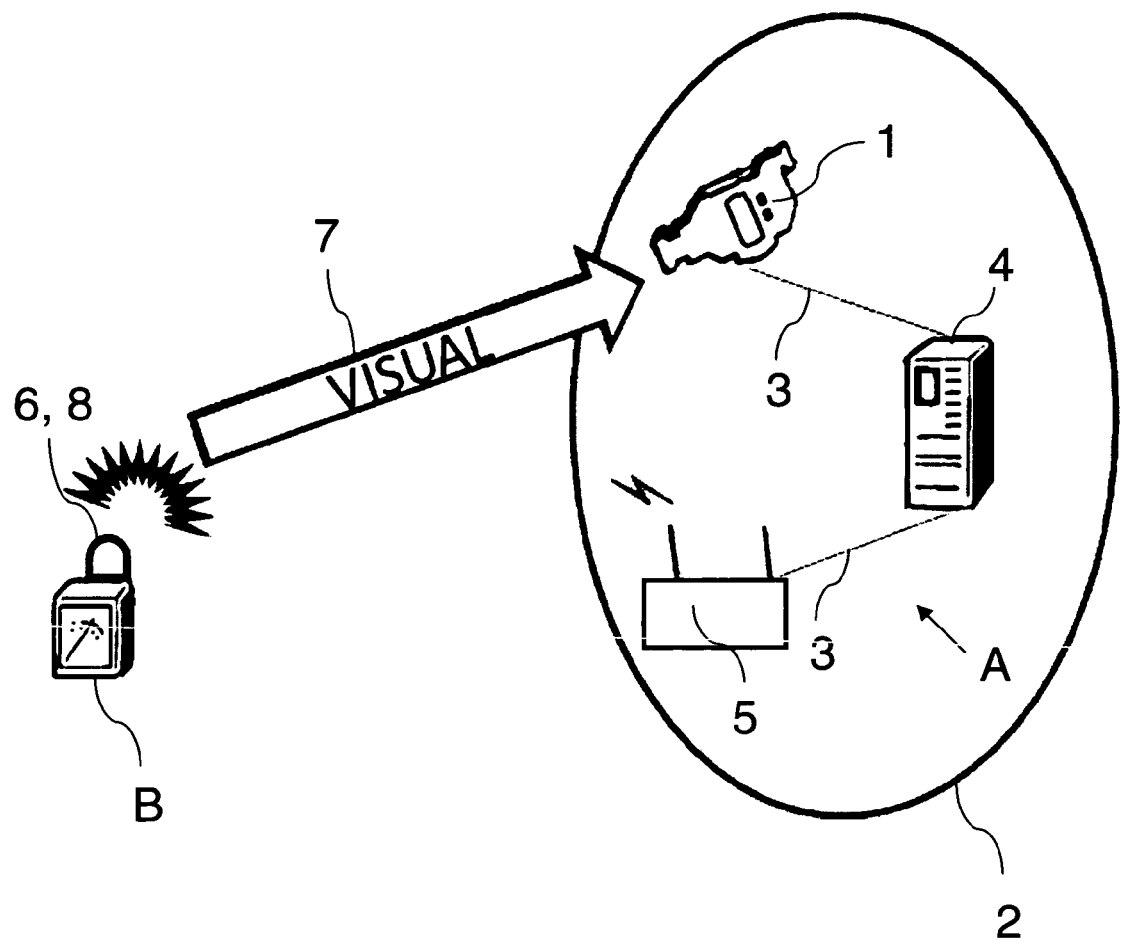
Figure 3:
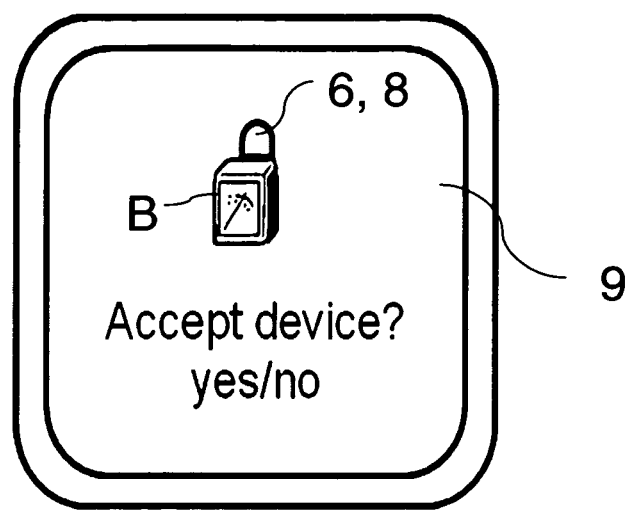

There are several ways how to design and further develop the teaching of the present invention in an advantageous way. To this end it is to be referred to the patent claims subordinate to patent claims 1 and 12 on the one hand and to the following explanation of a preferred embodiment of the invention by way of example, illustrated by the figure on the other hand. In connection with the explanation of the preferred embodiment of the invention by the aid of the figure, generally preferred embodiments and further developments of the teaching will we explained. In the drawing FIG. 1 is a schematic view illustrating a system for secure pairing of devices according to an embodiment of the present invention, FIG. 2 is a schematic view illustrating the embodiment of FIG. 1 with the out-of-band channel actually being employed, and FIG. 3 is a schematic view illustrating the step of performing an authorization decision in connection with the embodiment illustrated in FIGS. 1 and 2.

The number of devices that have wireless communication capabilities, e.g. sensors, M2M devices, etc., is increasing rapidly. Applications of such devices and use cases exist in many different variants, for instance in industrial, office and home environments. An example use case for wireless devices is given in an industrial plant, where wireless devices will be used to track raw materials, manufactured goods, or tools used in production. Wireless sensors collect information about the state of machines or the environment and monitor the production process in the plant. Instructions and warnings are transmitted to mobile receivers carried by workers in the plant and other actuators such as tools or machines can receive configuration updates.

A home automation example may include a home network that comprises wireless devices including sensors and actuators and a home server or home gateway. An installed camera system is assumed to be present for the detection of user and device activities. Instead of a fix installed camera, a home robot is possible who is equipped with a mounted camera and can move freely in the house to look for new devices. Wireless sensors collect information such as temperature, light, and state of home appliances. Actuators allow opening and closing windows and doors, making emergency calls, or switching devices on or off. "Home applications usually come from the areas of security and safety, quality of life and entertainment. This includes the automatic switching off of cooking stoves when leaving home, measures to prevent breaking and entry, the adjusting of room lights, temperature, and music to situation specific settings based on the habits of the user." (wikipedia).

The present invention provides a method and a system for secure device pairing with improved usability that reduces the handling of devices and makes an efficient decision from a remote control centre possible. According to the invention the device that was partner in the pairing protocol is identified on a visual OOB channel where the visual OOB channel is accessible from the area where new devices will be brought in or operated. The identification of the device is done automatically, by using pattern recognition algorithms to find a device that is transmitting a specific code that is known to the recognition algorithm. A picture of the identified device (together with the surroundings, as the case may be) is taken, which is then used to verify that the identified device is the intended device.

In the scenario illustrated in FIG. 1 an embodiment is illustrated in which a new device B is securely paired with a device A that is already deployed and securely integrated into an existing network environment 2, e.g. in a plant. In the illustrated embodiment a camera system 1 is assumed to be given monitoring the area—denoted operational area— where new devices that seek to be authorized to securely join the network environment 2 are to be placed. This is a plausible assumption, since many places, in particular plants and company premises, are already frequently camera monitored. In home environments cameras are considered to enable services, e.g. for assisted living, and will therefore be deployed more and more often.

The already deployed master device A has a security association 3 with the camera system 1. The master device A is preferably a server that manages the secure network environment 2, e.g. a server 4 equipped with wireless communication means 5 in a control room in an industrial plant scenario, or a home server/gateway in a home automation scenario. A single device that has a camera built in (e.g. a Smartphone) is also possible. As will be apparent to a skilled person the network environment 2 of FIG. 1 may include more network entities of all kinds than the illustrated ones, in particular further servers and cameras.

In the embodiment of FIG. 1 the new device B is equipped with a light source 6 to use a visual OOB channel 7. In the specific case the light source 6 is an LED 8 (which may operate in the visible or infrared frequency spectrum) mounted at a position that is well visible when the device B is carried or operated as intended.

FIG. 1 illustrates a first part of the exchange phase of the pairing protocol in which the following steps are executed:

1. Master device A and new device B execute an unauthenticated key exchange (e.g. the Diffie-Hellman protocol). Such protocols are known from prior art.

2. Both master device A and new device B compute a key confirmation code based on the secret key they obtained from step 1, e.g. by calculating a hash value. Such protocols are also known from prior art.

3. The camera system 1 connected to the master device A learns the key confirmation code from the master device A.

A second part of the exchange phase of the pairing protocol is illustrated in FIG. 2, in which the same reference numerals denote the same elements as in FIG. 1. The following steps are executed:

4. The new device B begins transmitting the key confirmation code over the visual OOB channel 7 by using its LED 8.

5. The camera system 1 uses image recognition to identify a device transmitting the key confirmation code. If no such device is found the protocol is aborted/restarted. This step is different compared to prior art, since in prior art solutions an OOB channel is specifically arranged to receive a (potentially wrong) signal from the new device. According to the present invention a (potentially wrong) device is identified that transmits the expected signal.

6. The camera system 1 takes an image of the identified device together with its surroundings and sends the image to the master device A.

FIG. 3 illustrates the outcome phase of the pairing protocol according to a preferred embodiment. After having received the picture of the identified device from the camera system 1, the master device A displays the image of the identified device on a display 9 that is already connected to the master device A. An operator on the display 9 may authorize the device of the picture as new device B that is authorized to securely join the network environment 2, thereby completing the pairing process. Alternatively, automatic image recognition may be employed to authorize the displayed device as new device B and to thus complete the pairing. However, the latter approach requires machine usable knowledge regarding the recognition of eligible devices, i.e. ones that should be granted access. For instance, such machine usable knowledge may be trained to distinguish between company laptops, to which access to the network environment 2 should be granted, and external laptops, e.g. brought into the sphere of the network environment 2 by customers or visitors, to which—generally—access should be denied at first.

According to the aforesaid the described embodiment uses—in contrast to prior art solutions—a special principle in that it looks for the device that was partner in the wireless pairing with image processing using a camera and then verifies that this is the intended device. The already deployed master device can, with help of the camera, identify the device that was the partner in the pairing operation (i.e. device B or a man-in-the-middle). To detect a possible attack, the picture of the identified device is used to make an authorization decision, e.g. by requesting a yes/no decision from the user to whom the picture is shown. Prior art sets first up an OOB channel between the new device and the host device only and then verifies that those devices were partner in the wireless pairing.

By employing the present invention a user can install or use a device without taking care for the pairing. No special interaction with the new device is needed, in particular the user does neither have to enter passwords on the device, nor set up a specific OOB channel, etc. The authorization can be given in a very usable way, e.g. by recognizing the device to be added on a screen and by inputting a yes/no decision, which can even be made from a remote location. As a result, the present invention requires much less user-involvement than state-of-the-art solutions. Moreover, the invention even allows to fully automating the pairing if image recognition is in place that is configured and trained to authorize devices based on given settings and specifications.

One of the preferred application scenarios of the present invention are office spaces that are sometimes camera monitored so that the prerequisites are given. Devices that are brought frequently in and out are laptops or smart phones of visitors and staff. After the initial pairing when a new device enters the office space, a camera can detect the new device and the network administrator receiving the picture at his desk can remotely permit access, e.g. for company laptops of certain visitors, while denying access for all private devices.

In the plant scenario outlined above, workers can bring new machines, materials and tools into the plant without caring for the wireless pairing. An operator can watch the scene on a monitor in a remote control centre and authorize or refuse wireless devices. In the home scenario, users can buy new sensors or smart objects and just integrate or use them without having to take care for pairing or even being aware of the wireless features. Users can be notified (e.g. on their smart phone or on the TV) that a new device was found in the house and can be asked to authorize or refuse this device. Embodiments of the present invention enable a home network management centre to do the decision remotely.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for secure pairing of wireless devices, wherein a master device (A) is deployed in a network environment (2), said method comprising the steps of:

placing, within an operational area, a new device (B) to be securely integrated into said network environment (2), the master device (A) and the new device (B) having executed an unauthenticated key exchange with said master device (A), monitoring the operational area with a camera system, wherein said master device (A) has a security association (3) with the camera system (1) that monitors the operational area where said new wireless device (B) is placed, based on the exchanged key of the unauthenticated key exchange, said master device (A) and said new device (B) each computing a key confirmation code, wherein said camera system (1) learns said key confirmation code from said master device (A), said camera system (1) i) watching for devices transmitting said key confirmation code via a visual out-of-band channel (7) and ii) providing an image to said master device (A) of each said device identified by the camera system as having transmitted said key confirmation code, and for each image of each said device identified by the camera system as having transmitted said key confirmation code, i) making an analysis of the image to determine whether the image is of the new device (B) that performed the unauthenticated exchanged key with the master device (A), and ii) based on said analysis and determination, making an authorization decision with respect to accepting each said device as the new device (B) of said network environment (2).

2. The method according to claim 1, wherein, in said monitoring step, the operational area monitored by said camera system (1) is a plant, an office, or a home environment.

3. The method according to claim 1, wherein said unauthenticated key exchange step between said new device (B) and said master device (A) is performed according to the Diffie-Hellmann protocol.

4. The method according to claim 1, wherein said key confirmation code is computed by calculating a hash value of said exchanged key.

5. The method according to claim 1, wherein said master device (A) transmits said key confirmation code to said camera system (1) via the existing security association (3).

6. The method according to claim 1, wherein, in said step of making the analysis of the image to determine whether the image is of the new device (B) that performed the unauthenticated exchanged key with the master device (A), said camera system (1) uses pattern recognition for identifying, from said image, the device transmitting said key confirmation code.

7. The method according to claim 1, wherein said pairing process is aborted in case said camera system (1) does not identify a new device transmitting said key confirmation code.

8. The method according to claim 1, wherein the image taken by said camera system (1) of a device identified as transmitting said key confirmation code includes the surroundings of said device.

9. The method according to claim 1, wherein said master device (A) displays the image taken by said camera system (1) of a device identified as transmitting said key confirmation code on a display (9) connected to said master device (A).

10. The method according to claim 9, wherein said authorization decision with respect to accepting said identified device as new device (B) of said network environment (2) is made by an operator on said display (9).

11. The method according to claim 1, wherein said authorization decision with respect to accepting said identified device as new device (B) of said network environment (2) is made on the basis of automatic image recognition using said image from the camera system.

12. A system for secure pairing of wireless devices, said system comprising:

a master device (A) that is deployed in a network environment (2), a new device (B) to be securely integrated into said network environment (2) and configured to execute an unauthenticated key exchange with said master device (A), a camera system (1) having a security association (3) with said master device (A), wherein the camera system (1) i) monitors an operational area where said new wireless device (B) is placed, and ii) learns a key confirmation code computed by said master device (A) and said new device (B) based on said master device (A) and said new device (B) performing the unauthenticated exchanged key, and said new device comprising a visual out-of-band channel (7) employed to transmit said key confirmation code, wherein said camera system (1) is configured to watch for a device transmitting said key confirmation code and to provide an image to said master device (A) of the device identified by the camera system as having transmitted said key confirmation code, and wherein i) an analysis of the image of said device, identified by the camera system as having transmitted said key confirmation code, is made to determine whether the image is an image of the new device (B) that performed the unauthenticated exchanged key with the master device (A), and ii) based on said determination, an authorization decision is made with respect to accepting said identified device as the new device (B) of said network environment (2).

13. The system according to claim 12, wherein said camera system (1) includes one or more fixed cameras and/or one or more mobile cameras.

14. The system according to claim 12, wherein said new device (B) is equipped with a light source (6), in particular an LED (8).

15. The system according to claim 12, wherein said new device (B) is equipped with displays being configured to display one- or two-dimensional barcodes.

16. The system according to claim 12, wherein said new device (B) is includes wireless sensors and/or actuators.

17. The system according to claim 12, wherein said master device (A) is a server (4) that manages said network environment (2).

18. The system according to claim 12, wherein said master device (A) is part of a remote control center of an industrial production site.

19. The system according to claim 12, wherein said master device (A) is a portable communication device being equipped with a camera.

20. The system according to claim 12, wherein said camera system is configured to use pattern recognition to perform i) the analysis of the image of said device, identified by the camera system as having transmitted said key confirmation code, to determine whether the image is the image of the new device (B) that performed the unauthenticated exchanged key with the master device (A), and ii) based on said determination, make the authorization decision with respect to accepting said identified device as the new device (B) of said network environment (2).

* * * * *